(12) United States Patent
Howell

(10) Patent No.: US 7,569,266 B2
(45) Date of Patent: Aug. 4, 2009

(54) FORMABLE MASKING PAPER

(75) Inventor: Laurence L. Howell, Tucson, AZ (US)

(73) Assignee: T9 Products, Inc., Tucson, AZ (US)

( * ) Notice: Subject to any disclaimer, the term of this patent is extended or adjusted under 35 U.S.C. 154(b) by 0 days.

(21) Appl. No.: 11/058,753

(22) Filed: Feb. 15, 2005

(65) Prior Publication Data

US 2006/0182919 A1    Aug. 17, 2006

(51) Int. Cl.
*B32B 7/02* (2006.01)
*B32B 9/00* (2006.01)

(52) U.S. Cl. .................. 428/218; 428/40.1; 428/212; 428/213; 428/219

(58) Field of Classification Search .............. 428/343, 428/351, 354, 906, 40.1, 212, 213, 218, 219
See application file for complete search history.

(56) References Cited

U.S. PATENT DOCUMENTS

| | | | | |
|---|---|---|---|---|
| 4,263,347 A * | 4/1981 | Banta | .................. | 427/282 |
| 5,441,810 A * | 8/1995 | Aizawa et al. | .............. | 428/354 |
| 6,093,466 A * | 7/2000 | Steinke et al. | .............. | 428/40.1 |
| 6,387,503 B1 * | 5/2002 | Verschaeren | ................. | 428/412 |
| 6,833,038 B2 * | 12/2004 | Iwen et al. | ..................... | 156/71 |

\* cited by examiner

*Primary Examiner*—Patricia L Nordmeyer

(57) ABSTRACT

A masking paper for use during the restoration or repair of, for example, vehicles and other equipment that have a decorative coating. The masking paper is suitable for conforming to the profile of the surface to be protected without tearing or losing it masking qualities. The masking paper is formed of a substrate, a first ply attached to the substrate, a second ply attached to the first ply and a top layer attached to the second ply. The top layer is formed of a barrier ply attached to the second ply and an abortion ply attached to the barrier ply.

15 Claims, 1 Drawing Sheet

FORMABLE MASKING PAPER

BACKGROUND OF THE INVENTION

The present invention generally relates to the field of protective coatings and masks that are often used during the restoration or repair of vehicles and other equipment that have a decorative coating. In particular, the present invention is directed to a masking paper that is suitable for conforming to the profile of the surface to be protected without tearing or losing its masking qualities. The masking paper of the invention is not limited in use to the automotive industry and has application wherever a high quality and economical mask is required.

Many surface restoration operations, such as painting, often require masking of certain portions of the surface to prevent over spray. Removing inadvertent over spray from unprotected areas on the surface can be time consuming and risk damaging the original paint on the over sprayed surface. In order to avoid over spray on a vehicle, for example, it is often necessary to mask, trim and windows on the vehicle from paint over spray as well as existing painted surfaces. Even in a case where the existing painted surface is theoretically the same color as the new surface to be painted, masking is still necessary in order to prevent minor variations in color between the original and newly painted surfaces from being noticeable.

In addition to masking for the purpose of preventing over spray, masking also is necessary for surfaces that are susceptible to marring and scratching. For example, during sanding or buffing of an adjacent surface, minute debris from these operations can contaminate and deface unprotected surfaces. Welding and grinding operations also pose the risk of deleterious effects on adjacent surfaces.

Shielding adjacent surfaces from the effects of operations on near by surfaces can be very time consuming and thus expensive, especially when great care must be taken to prevent even the slightest amount of collateral damage. Such shielding or masking, and the required remove-ability of the mask after a painting operation, can account for a substantial portion of the cost of painting an automobile or any of its parts.

The mask itself must be resistant to bleed through, durable so that its masking characteristics last for the duration of the restoration operation, and can be easily removed at the conclusion of the restoration operation. It must also be readily conformable to the profile of the surface to be protected. Other desirable characteristics of the mask include light weight, adaptability to formation in a roll for easy storage and transport and that it be economical in cost.

Attempts have been made in the prior art to use various forms of chemical masks. These attempts have, for the most part, not been successful. Thus, those who restore and paint vehicles continue to rely on the traditional use of masking tape and paper to cover portions of a vehicle where paint is not desired and to prevent over spray. This is a very labor intensive process and is not fool proof. In many cases after the painting operation, some amount of clean up of adjacent areas will still be necessary when using prior art masking techniques and methods.

For all of the above reasons, prior art approaches to masking papers, chemical and the like remain deficient.

SUMMARY OF THE INVENTION

Accordingly, it is the overall objective of the present invention to overcome the above noted deficiencies in prior art masking approaches and techniques.

It is a specific objective of the present invention to provide a masking paper that is inexpensive and cost effective to manufacture.

It is another specific objective of the present invention to provide a masking paper that is easy to use and effective in masking the surface from the effects of operations on adjacent surfaces.

It is a still further specific objective of the present invention to provide a masking paper that can be easily removed after operations on adjacent surfaces have been completed.

It is another specific objective of the present invention to provide a masking paper that does not harm or mar the surface being protected.

It is a still further objective of the present invention to provide a masking paper that can conform to surface profiles without tearing or loosing its masking characteristics.

BRIEF DESCRIPTION OF THE DRAWINGS

The novel features of the present invention are set out with particularity in the appended claims. But the invention will be understood more fully and clearly from the following detailed description of the invention as set forth in the accompanying drawings in which:

DESCRIPTION OF THE PREFERRED EMBODIMENT

A preferred embodiment of the present invention will now be described with respect to the accompanying drawings.

Figure 1:
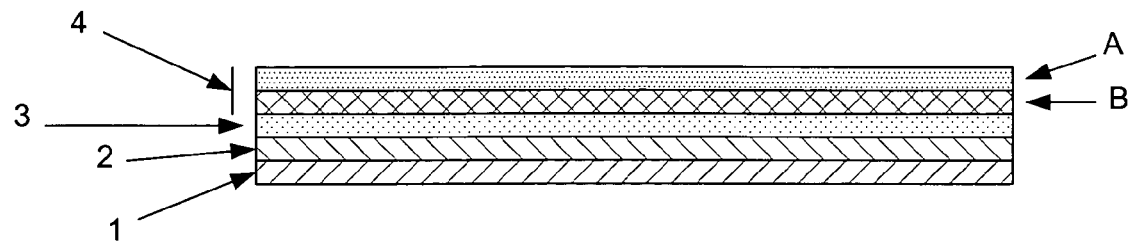
FIG. 1 is a cross section of a masking paper in accordance with the present invention.

FIG. 1 is a cross-section of a masking paper in accordance with one embodiment of the present invention. As illustrated in FIG. 1, the masking paper includes a substrate 1, an interior first ply 2, an interior second ply 3 and a top layer 4.

Top layer 4 is formed of a double clay coating having an absorbent ply A for absorbing contaminants that come into contact with the paper and a barrier ply B for preventing those contaminants from penetrating through the paper to the surface to be protected.

Figure 2:
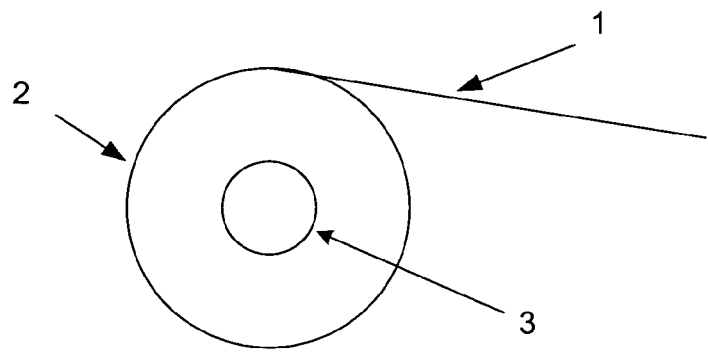
FIG. 2 illustrates the masking paper of the present invention wound on a role in accordance with the present invention.

Using conventional techniques, the masking paper of the present invention can be fabricated in elongated sheets that can be formed in a roll for easy storage and transport. As shown in FIG. 2, sheet 1 is formed in a roll 2 around a core 3. Sheet 1 and resulting roll 2 can be fabricated in convenient manufacturing widths as known in the art and then be split into smaller sheets and roll widths as also known in the art.

Figure 3:
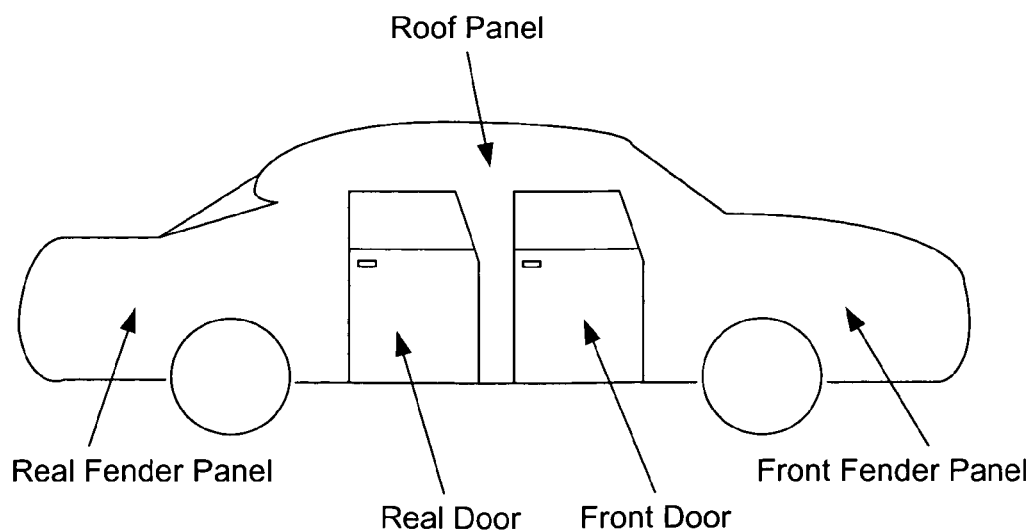
FIG. 3 illustrates a vehicle on which the masking paper of the present invention may be used.

As pointed out above, vehicle surface restoration and painting is one of the primary uses of masking paper. FIG. 3 is an illustration of a typical vehicle which might require restoration of some of its surfaces, for example when body work needs to be done as a result of an accident.

Like the vehicle shown in FIG. 3, most objects that require surface treatment have many discontinuous surface planes. The masking paper must readily conform to these discontinuous surface planes without loosing their masking characteristics.

In addition to conformability, the color and reflectivity of top layer 4 of the masking paper as shown in FIG. 1 must also be such that it allows the borders of the paper to be easily distinguished. An appropriate color and reflectivity of top layer 4 also is important so that, for example, painters can better determine how much paint to lay down on the surface being treated and to determine proper color blending.

On those occasions when the paper is wound in a roll, the paper must not exhibit a "wind memory" when it is unwound. Accordingly, the paper must unwind flat and not have a tendency to curl in the wind or cross direction.

It has been found that in order to meet all of the requirements that a masking paper must have in order to exhibit the requisite resistance to bleed through, color, weight, absence of wind memory, durability and conformability, the paper must be made to the following specifications.

The average tensile strength in the machine direction of the paper should be on the order of at least 22.0 pounds. Machine direction is the direction the paper moves through the manufacturing process. The fibers in the paper tend to lay in rows in the machine direction and tensile strength is the force that it takes to break the fibers in their lengthwise direction.

The average tensile strength in the cross direction of the paper should be on the order of at least 27.0 pounds. Tensile strength in the cross direction is the tensile force that it takes to break apart the bonds between the fibers.

The tear strength of the paper in the machine direction should be on the order of at least 24.0 pounds and tear strength of the paper in the cross direction should be on the order of at least 27.0 pounds.

The masking paper must also have an acceptable porosity with respect to ply B of top layer 4 illustrated in FIG. 1. Porosity relates to the ability of the paper to accept, for example, over spray paint. According to the present invention, a porosity with a densitometry reading of 6,000 is ideal for the masking paper of the present invention.

The masking paper must also have as few pinholes as possible. Pinholes are small holes in the paper that allow foreign objects and other undesirable matter to pass through the paper to the surface to be protected. The permissibility and extent of pinholes in the paper will depend on its application and use.

Other characteristics that applicant has determined provide an ideal masking paper on the basis of paper weight are:

| | |
|---|---|
| Weight | 30.0 to 33.0 pounds |
| Caliper per Ply | 2.3 |
| Moisture Content | 4.5 |
| Bond - Scott | 270.0 or higher |
| Smoothness-Shfld-w | 28.0 |
| Smoothness-P.surf | 1.3 |
| Opacity Dry | 80.0 percent |
| Gloss-75 Deg. Hunter | 45.0 |
| Brightness | 82.0 to 87.0 |

It should be understood that other combinations of paper specifications can also be used to achieve characteristics and performance of the masking paper of the present invention.

The masking paper of the present invention has been described in connection with painting in the restoration of vehicle surfaces. However, the masking paper of the present invention is not limited to this use and application. It has been found that the masking paper can be used in a wide variety of applications where a mask barrier is required. Many such applications exist, for example, in the aviation industry where surface treatments and restoration have a heightened degree of importance because of the inherent safety implications.

The marine industry offers another example where proper surface restoration and maintenance are necessary. Boats and other water borne objects require constant surface maintenance due to the natural corrosive effects of water, especially of salt water. The masking paper of the present invention allows such maintenance to be carried out much more cost effectively than prior art techniques and methods.

The masking paper of the present invention may also be used in the packaging industry to protect articles from damage after their manufacture. One such use is the protection of decorative surfaces during the construction of, for example, a home. Such decorative surfaces include counter tops, cabinetry, hard wood flooring, wall trim and molding. In addition, many construction materials have a decorative or "finished" surface which require protection from inadvertent damage. For example, siding panels that are used to cover the exterior of a home must be protected from marring of the finished surface by interleaving a protective sheet between the panels when stacked for shipment to the construction site. The masking paper of the present inventions is an ideal solution to this need.

It should be obvious from the above-discussed embodiment of the present invention that numerous other variations and modifications of the invention are possible, and such will readily occur to those skilled in the art. Accordingly, the scope of this invention is not to be limited to the embodiment disclosed, but is to include any such embodiments as may be encompassed within the scope of the claims appended hereto.

I claim:

1. A masking paper for protecting a surface, said masking paper comprising:
   a substrate, said substrate being positionable immediately adjacent said surface to be protected and is sufficiently smooth to cover said surface;
   a first ply bonded to said substrate;
   a second ply bonded to said first ply; and
   a top layer bonded to said second ply, wherein said top layer includes an absorbent ply for absorbing contaminants that come into contact with said top layer, wherein said paper is an elongated sheet with a predetermined machine direction, at least one of said substrate, said first ply, said second ply and said top layer is formed with paper fibers aligned in rows in said machine direction.

2. A masking paper according to claim 1, wherein said top layer further includes a barrier ply between said second ply and said absorbent ply for preventing said contaminants from penetrating through to said surface to be protected.

3. A masking paper according to claim 1, wherein the tensile strength of the materials used to form said masking paper in said machine direction is at least 22 pounds.

4. A masking paper according to claim 3, wherein the tensile strength of the materials used to form said masking paper in the direction that is perpendicular to said machine direction is at least 27 pounds.

5. A masking paper according to claim 4, wherein the material used to form said barrier ply has a densitometry reading of at least 6,000.

6. A masking paper for protecting a surface, said masking paper comprising:
   a substrate having a top surface and a bottom surface, wherein said bottom surface is positionable immediately adjacent said surface to be protected and is sufficiently smooth to cover said surface;

a first ply having a top and bottom surface, wherein said bottom surface of said first ply is attached to said top surface of said substrate;

a second ply having a top and bottom surface, wherein said bottom surface of said second ply is attached to said top surface of said first ply; and a top layer having a top and bottom surface, wherein said bottom surface of said top layer is attached to said top surface of said second ply, and wherein said top layer includes an absorbent ply having contaminate absorbing properties for absorbing contaminants that come into contact with said top layer, and wherein said paper is an elongated sheet with a predetermined machine direction, at least one of said substrate, said first ply, said second ply and said top layer is formed with paper fibers aligned in rows in said machine direction.

7. A masking paper according to claim 6, wherein said top layer further includes a barrier ply between said second ply and said absorbent ply for preventing said contaminants from penetrating through to said surface to be protected.

8. A masking paper according to claim 7, wherein said barrier ply is formed of a material having a densitometry reading of at least 6,000.

9. A masking paper according to claim 6, wherein the tensile strength of said material fibers in said machine direction is at least 22 pounds.

10. A masking paper according to claim 6, wherein the tensile strength of said material fibers in the direction that is perpendicular to said machine direction is at least 27 pounds.

11. A masking paper according to claim 6, wherein said top surface of said top layer is formed of a material having a brightness reading of about 82.

12. A masking paper according to claim 6, wherein the materials used to form said masking paper have a combined moisture content of about 4.5 per 30 pounds of weight.

13. A masking paper according to claim 6, wherein the material used to form the top of said top layer of said masking material has a smoothness by Sheffield method of about 28.

14. A masking paper according to claim 6, wherein the materials used to form said masking paper have a caliper per ply of about 2.3.

15. A masking paper according to claim 6, wherein the materials used to form said masking paper have a combined opacity of about 80 percent.

* * * * *